(12) United States Patent
Kuhnke

(10) Patent No.: US 9,302,300 B2
(45) Date of Patent: Apr. 5, 2016

(54) METHOD FOR COMPLETING A CHEMICAL POWER PLANT CLEANING

(75) Inventor: Klaus-Dieter Kuhnke, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 552 days.

(21) Appl. No.: 13/816,525

(22) PCT Filed: May 11, 2011

(86) PCT No.: PCT/EP2011/057590
§ 371 (c)(1),
(2), (4) Date: Feb. 12, 2013

(87) PCT Pub. No.: WO2012/019793
PCT Pub. Date: Feb. 16, 2012

(65) Prior Publication Data
US 2013/0139855 A1    Jun. 6, 2013

(30) Foreign Application Priority Data
Aug. 13, 2010   (EP) .................................... 10172770

(51) Int. Cl.
| | | |
|---|---|---|
| *B08B 9/027* | (2006.01) | |
| *B08B 9/08* | (2006.01) | |
| *F28G 9/00* | (2006.01) | |
| *F22B 37/52* | (2006.01) | |
| *B08B 9/00* | (2006.01) | |
| *F01K 23/10* | (2006.01) | |

(52) U.S. Cl.
CPC ... *B08B 9/08* (2013.01); *B08B 9/00* (2013.01); *B08B 9/027* (2013.01); *F01K 23/10* (2013.01); *F22B 37/52* (2013.01); *F28G 9/00* (2013.01)

(58) Field of Classification Search
CPC ........... B08B 9/027; B08B 9/08; F22B 37/52; F01K 23/10
See application file for complete search history.

(56) References Cited

U.S. PATENT DOCUMENTS

| | | | | |
|---|---|---|---|---|
| 2002/0190029 A1* | 12/2002 | Lange, Jr. | ................. | C23F 1/44 216/100 |
| 2008/0236616 A1* | 10/2008 | Bloch | ................... | F22B 37/486 134/2 |

FOREIGN PATENT DOCUMENTS

| | | |
|---|---|---|
| CN | 101512281 A | 8/2009 |
| CN | 101611172 A | 12/2009 |
| CN | 101652514 A | 2/2010 |
| DE | 3714312 A1 | 11/1988 |
| DE | 19843442 C1 | 3/2000 |
| DE | 102008041733 A1 | 3/2010 |
| EP | 0273182 A1 | 7/1988 |
| EP | 1797969 A1 | 6/2007 |
| EP | 2186577 A1 | 5/2010 |
| RU | 2177594 C1 | 12/2001 |
| RU | 2204101 C1 | 5/2003 |
| RU | 2218533 C2 | 12/2003 |
| RU | 2285218 C1 | 10/2006 |

OTHER PUBLICATIONS

Machine translation: EP0273182A1; Kunhke et al.; 1988.*
Abstract: DE102008041733; Kappel et al.; 2010.*

* cited by examiner

*Primary Examiner* — Michael Kornakov
*Assistant Examiner* — Natasha Campbell

(57) ABSTRACT

A method is provided for cleaning at least a part of a water-steam circuit of a power plant. The method includes introducing a cleaning solution into the part requiring to be cleaned and subsequently draining off the cleaning solution. While the cleaning solution is being drained off or immediately thereafter, steam for flushing is injected via a steam injection device into the part requiring to be cleaned at at least one high point of the part requiring to be cleaned and low-point drains are opened or remain open in the part requiring to be cleaned and steam continues to be injected until steam emerges from the low-point drains and those low-point drains from which steam emerges are closed, and steam continues to be injected until steam has emerged from all low-point drains, upon which the steam injection device is closed and all low-point drains are reopened.

8 Claims, 2 Drawing Sheets

METHOD FOR COMPLETING A CHEMICAL POWER PLANT CLEANING

CROSS REFERENCE TO RELATED APPLICATIONS

This application is the U.S. National Stage of International Application No. PCT/EP2011/057590, filed May 11, 2011 and claims the benefit thereof. The International Application claims the benefits of European application No. 10172770.9 EP filed Aug. 13, 2010. All of the applications are incorporated by reference herein in their entirety.

FIELD OF INVENTION

The invention relates to a method for cleaning at least a part of a water-steam circuit of a power plant, in particular a water-saving method for completing a chemical cleaning operation in a power plant.

BACKGROUND OF INVENTION

The water-steam circuit of a power plant is normally cleaned by chemical means before being taken into service. Either acids or EDTA (ethylenediaminetetraacetic acid) are used for this purpose. These chemicals must be removed from the system again upon completion. At least four times the system volume (up to 1000 m3) is necessary for this in a typical acid cleaning operation. This gives rise to two problems:

1. The total volume must be treated as wastewater or disposed of. In light of increasingly stringent statutory requirements this leads to high costs.

2. The post-flushing process is susceptible in terms of execution and drainage if not carried out correctly. The risk of renewed corrosion is great.

For this reason the wetting agent step and the pickling step are usually combined during the acid cleaning operation, whereby the pickling solution is not drained off and subsequently is replaced wet on wet by deionized water and thereafter passivated. Water consumption is high, however.

EP 0 273 182 discloses a method for cleaning a vessel, wherein iron oxide present in the vessel is dissolved by means of a complex-forming acid, and the iron oxide is removed as a dissolved iron complex by emptying of the vessel. In order to prevent air ingress during emptying, the vessel is evacuated by means of an inert gas, in particular by means of nitrogen or water vapor, which is injected under pressure.

SUMMARY OF INVENTION

The object of the invention is to develop the aforesaid method further in order to reduce the wastewater volume.

In the method disclosed in EP 1 797 969 A1 for cleaning components of a power plant, steam condensed in the condenser is conducted continuously in a closed flow circuit through one or more plant parts requiring to be cleaned, wherein a check is carried out in at least one operational plant part in order to test the degree of purity of the medium. By this means cleaning is possible without interruption until the requisite freedom from particles is achieved.

DE 198 43 442 C1 discloses a device and a method for cleaning steam-conducting components in plants having steam boilers. With this solution, the steam blown through the component requiring to be cleaned is cleaned in a centrifugal separator and fed back by way of the condenser of the plant into the boiler apparatus for the purpose of generating the blowout steam.

The above-stated object is achieved by the features of the independent claim(s). Advantageous developments of the invention are defined in the respective dependent claims. In a method for cleaning at least a part of a water-steam circuit of a power plant, wherein a cleaning solution is introduced into the part requiring to be cleaned and subsequently is drained off, while the cleaning solution is being drained off or immediately thereafter steam for flushing is injected into the part requiring to be cleaned at at least one high point of the part requiring to be cleaned and low-point drains are opened or remain open in the part requiring to be cleaned and steam continues to be injected until steam emerges from the low-point drains and those low-point drains from which steam emerges are closed, and steam continues to be injected until steam has emerged from all low-point drains, whereupon the steam injection means is closed and all low-point drains are reopened, the following is achieved:

When the cleaning solution is drained off from the system and steam is injected immediately after or during the draining operation, with the low-point drains remaining open, the inflowing steam condenses on the metal surfaces and the condensate formed is discharged by way of the drain. Using steam instead of water allows the wastewater volume to be reduced. This means a smaller pickling bath is possible and the disposal costs are also reduced.

The condensation causes the metal to heat up and the condensation point shifts from the injection point toward the low-point drain. Effective cleaning from the high point to the low-point drain is thereby ensured.

While steam is being injected at a high point there is furthermore no need to wait until the cleaning solution has been completely or at least largely drained off, but instead steam can be introduced into the part requiring to be cleaned immediately the cleaning solution starts to be drained off, thus enabling the cleaning operation to be completed faster.

Because at least one low-point drain remains open in the part requiring to be cleaned, with steam continuing to be injected until steam emerges from the low-point drain, it is ensured that the entire system, from the high point to the low-point drain, has come into contact with a volume of steam that is sufficient for cleaning purposes.

When steam emerges from the low-point drain it can be assumed that the flushing of the system has been completed, at least in the region of said low-point drain. In larger-scale systems steam continues to be injected in this case until steam has emerged from all low-point drains of the part requiring to be cleaned. At that time the steam injection means is closed and all the drains are reopened.

It is beneficial in this case if the steam is injected into a drum of a steam boiler which is arranged above the evaporator and centrally with respect to a system comprising an economizer, an evaporator and a superheater.

It is advantageous if an alkalizing agent is added to the steam. This enables the effectiveness of the subsequent dry lay-up to be increased. When steam generation plants are taken out of service, lay-up is important in order to protect the plant against downtime corrosions.

Ammonia is beneficially added to the steam as an alkalizing agent. As one of the most commonly produced chemicals and a basic material for the production of many other nitrogen compounds, ammonia is manufactured on an industrial scale and consequently is readily available at manageable cost.

It is advantageous if deaerators are opened in the cleaned part of the power plant following the steam flushing operation until residual water has evaporated from the system. Opening all deaerators and drains immediately after the flushing operation causes residual water to evaporate completely from the hot system and the system is thus in a dry lay-up state.

The method advantageously finds application in a steam power station as power plant installation.

It is equally advantageous if the method is used in a combined gas and steam turbine system as power plant installation.

It is particularly advantageous if the method is used in a water-steam circuit of a heat recovery steam generator.

The wastewater volume is reduced by means of the inventive method. This means a smaller pickling bath is possible and the disposal costs are reduced. Furthermore, the system is preserved in a dry lay-up state upon completion of the steam flushing operation.

BRIEF DESCRIPTION OF THE DRAWINGS

The invention is explained in more detail with reference to the schematic drawings which are not drawn to scale and in which.

DETAILED DESCRIPTION OF INVENTION

Figure 1:
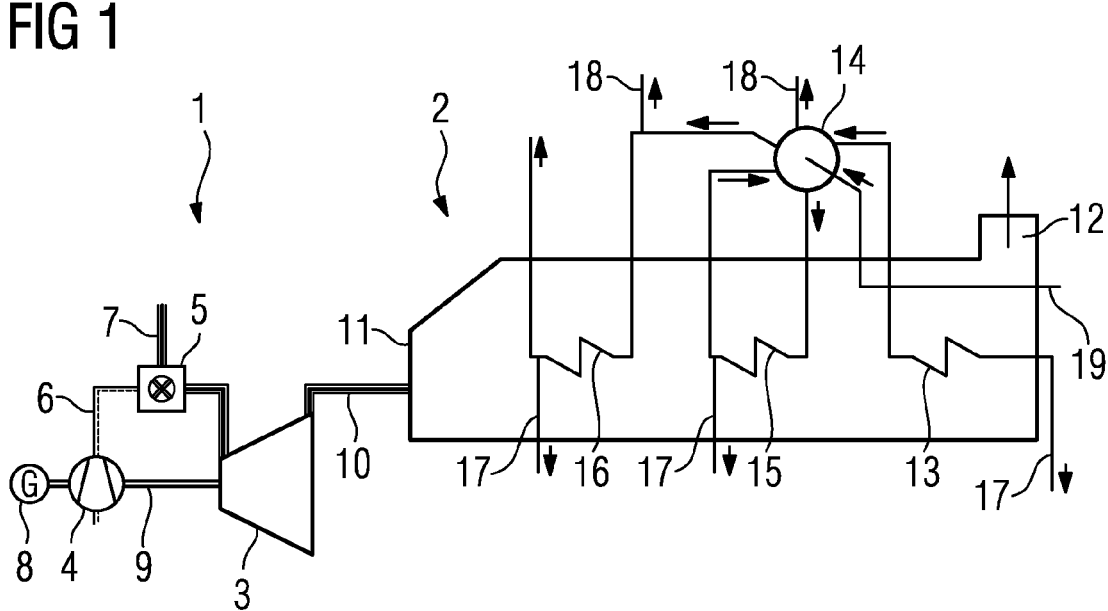
FIG. 1 shows a detail of a combined gas and steam turbine plant in the cold state.

FIG. 1 shows in schematic and exemplary form a detail of a combined gas and steam turbine plant, comprising a gas turbine plant 1 and a heat recovery steam generator 2. In this arrangement the gas turbine plant 1 comprises a gas turbine 3 with air compressor 4 coupled thereto and a combustion chamber 5 disposed upstream of the gas turbine 3 and connected to a fresh air line of the air compressor 4. A fuel line 7 leads into the combustion chamber 5. The gas turbine 3 and the air compressor 4 as well as a generator 8 are seated on a common shaft 9.

Only the heat recovery steam generator 2 of the steam turbine plant is shown. An exhaust gas line 10 is connected to an inlet 11 of the heat recovery steam generator 2 for the purpose of feeding working medium expanded in the gas turbine 3 or flue gas into the heat recovery steam generator 2. The expanded working medium from the gas turbine 3 exits the heat recovery steam generator 2 by way of the latter's outlet 12 in the direction of a stack (not shown in further detail).

Components of the high-pressure part of a water-steam circuit of the steam turbine plant in the heat recovery steam generator 2 are shown by way of example. A condensate preheater 13 or economizer is connected on the outlet side to a steam drum 14 for the circulating water and for steam separation. An evaporator 15 is connected to the drum 14 on the inlet and outlet side in order to form a closed evaporator circuit. Preheated feedwater flows by way of the drum 14 into the evaporator 15, is evaporated there and returned in the form of saturated steam to the drum 14. Steam that has been separated off is conducted into the superheater 16, where it is superheated. The superheater 16 is connected on the outlet side to a steam inlet of a steam turbine (not shown).

The components of the water-steam circuit have low-point drains 17 for draining off residual water. Deaerators 18 serve to vent the water-steam circuit. An auxiliary steam line 19 leads into the drum 14.

Figure 2:
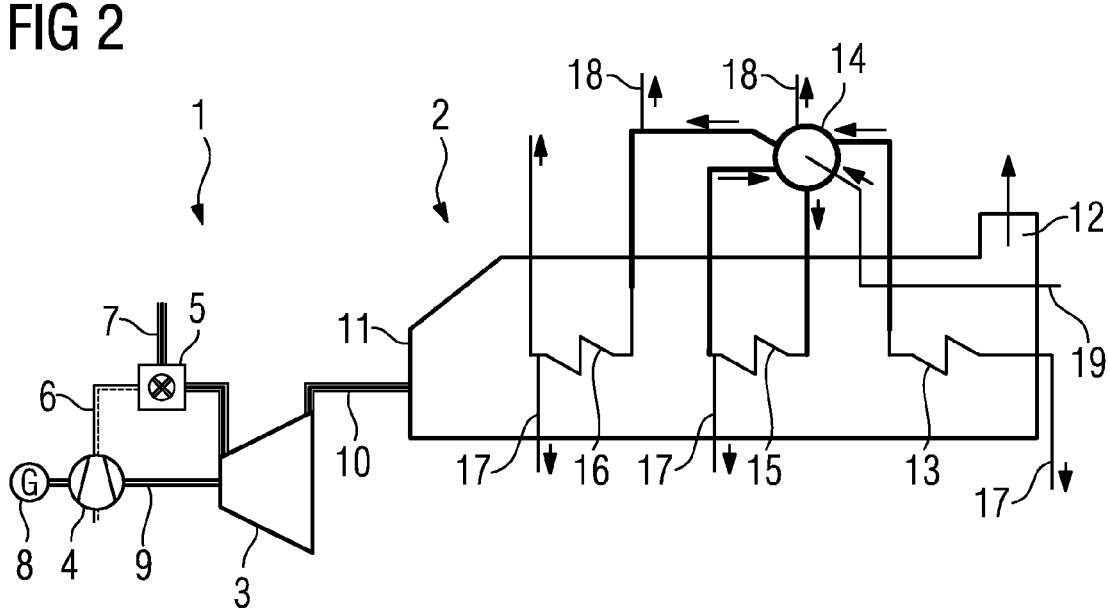
FIG. 2 shows a detail of a combined gas and steam turbine plant in a partially heated state.
Figure 3:
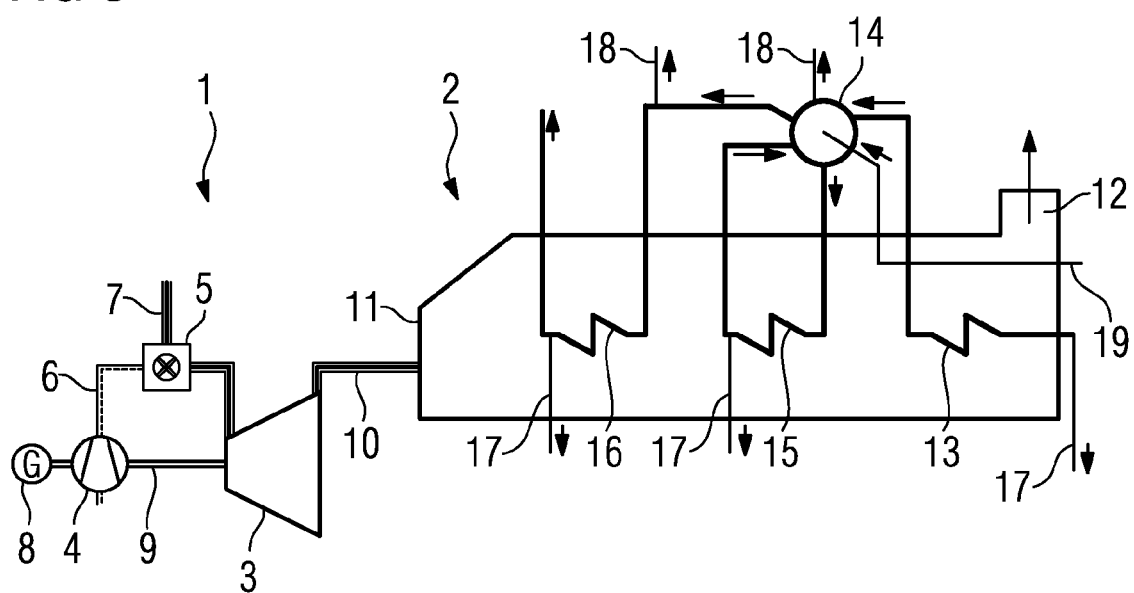
FIG. 3 shows a detail of a combined gas and steam turbine plant filled with steam.

FIGS. 1 to 3 are identical in respect of the apparatus shown. However, it is aimed to illustrate the inventive method in a more intelligible manner with the aid of different line widths for the same component in different figures. In this scheme a thin line in the heat recovery steam generator 2 stands for a cold component on which steam condenses, and a thick line stands for a hot component (>100° C.).

FIG. 1 accordingly shows the cold system during the chemical cleaning, in which either acids or EDTA are used. As soon as the cleaning solution is drained off by way of the low-point drains 17, steam can be conducted into the drum 14 by way of the auxiliary steam line 19 for post-flushing purposes. The steam condenses on the metal surfaces of drum 14, evaporator 15, condensate preheater 13, superheater 16 and the lines connecting them, and the condensate formed is discharged by way of the low-point drains 17.

As the time during which steam is supplied increases, the metal heats up due to the condensation, and the condensation point shifts starting from the steam drum 14 as injection point in the direction of low-point drains 17 (see FIG. 2).

When the system is suitably heated up, as shown in FIG. 3, and the flushing operation has been completed, steam emerges from a low-point drain 17. In larger-scale systems having a plurality of low-point drains 17, those low-point drains 17 from which steam emerges are closed and the flushing process is continued until steam has emerged from all low-point drains 17. The steam injection means is then closed and all low-point drains 17 are reopened. In addition, deaerators 18 are also opened in order to improve the evaporation of the residual water.

The invention claimed is:

1. A method for cleaning at least a part of a water-steam circuit of a power plant, the method comprising:
   introducing a cleaning solution into the part requiring to be cleaned and subsequently draining off the cleaning solution,
   wherein, while the cleaning solution is being drained off or immediately thereafter, steam for flushing is injected via a steam injection device into the part requiring to be cleaned at least one high point of the part requiring to be cleaned and low-point drains are opened or remain open in the part requiring to be cleaned and steam continues to be injected until steam emerges from the low-point drains and those low-point drains from which steam emerges are closed, and steam continues to be injected via the steam injection device until steam has emerged from all low-point drains, whereupon the steam injection device is closed and all low-point drains are reopened.

2. The method as claimed in claim 1, wherein the steam is injected into a drum of a steam boiler.

3. The method as claimed in claim 1, further comprising adding an alkalizing agent to the steam.

4. The method as claimed in claim 3, wherein the alkalizing agent comprises ammonia.

5. The method as claimed in claim 1, further comprising opening deaerators in the cleaned part of the power plant following the steam flushing operation until residual water has evaporated from the system.

6. The method as claimed in claim 1, wherein the power plant is a steam power plant.

7. The method as claimed in claim 1, wherein the power plant is a combined gas and steam turbine power plant.

8. The method as claimed in claim 1, wherein the water-steam circuit is the water-steam circuit of a heat recovery steam generator.

\* \* \* \* \*